United States Patent Office 2,946,714
Patented July 26, 1960

2,946,714

FUNGICIDAL COMPOSITIONS COMPRISING REACTION PRODUCTS OF ETHYLENE AND SULFUR

Irving D. Webb and John W. Yale, Jr., Yorba Linda, Calif., assignors, by mesne assignments, to Collier Carbon and Chemical Corporation, a corporation of California No Drawing. Filed Mar. 18, 1957, Ser. No. 646,529

12 Claims. (Cl. 167—22)

This invention relates to novel compositions of matter useful as fungicides, and more particularly concerns fungicidal compositions in which the essential active ingredient is a reaction product of ethylene and elemental sulfur. It further relates to a method for preparing a fungitoxic material.

It is known that the solid polymeric products obtained by reacting ethylene dichloride with sodium polysulfide have fungicidal properties. Such materials, however, leave considerable to be desired in the way of fungicidal activity, and are relatively expensive in that their formation requires the consumption of chemical elements, i.e., chlorine and sodium, which do not appear in the fungicidal product. The present invention is based on our discovery that products of enhanced fungicidal activity may be prepared by direct reaction between ethylene and elemental sulfur. The product of such reaction comprises a plurality of chemical compounds of unknown structure, and while some of such compounds are probably of polymeric structure they differ from the prior art polymers in being liquids rather than rubbery solids. Because of their unknown structure, the present fungicidal products are herein defined by their method of preparation. For convenience, they are referred to as "polyethylene sulfides," although it is not to be understood that such term is intended to constitute an accurate description of their nature.

As stated, the present polyethylene sulfide products are formed by direct reaction between elemental sulfur and ethylene. Depending upon the conditions under which the reaction is effected, from as little as one to as many as about six atoms of sulfur can be made to combine with each ethylene molecule. However, since ethylene is a gas at atmospheric temperatures and pressures, and any unreacted ethylene is hence readily removed from the reaction product, it is preferred to provide an excess of the ethylene reactant to insure complete consumption of the sulfur reactant. Accordingly, while the reactants combine in the aforementioned ratios, and the fungicidally active reaction product will contain an average of between one and about six atoms of sulfur per molecule of ethylene, the latter is usually provided in excess of such amount. Conveniently, such excess will amount to at least about 25 percent and may amount to as much as 500 percent. When effecting the reaction under such conditions that between about 2 and about 3 gram atoms of sulfur combine with each gram mole of ethylene, it is preferred to provide about one gram mole of the ethylene per gram atom of sulfur. As previously stated, the unreacted ethylene is readily recovered for re-use.

The reaction takes place readily at temperatures between about 75° C. and about 250° C. and under pressures between about 200 and about 5000 p.s.i.g. In general, operation at the higher temperatures and pressures within these ranges promotes the formation of products containing a relatively high proportion of sulfur and having superior fungicidal properties. Accordingly, the reaction temperature is preferably maintained between about 120° C. and about 160° C., and the pressure is maintained between about 1500 and about 3000 p.s.i.g. It is also preferable, although not necessary, to carry out the reaction in the presence of a small amount of anhydrous ammonia or an amine, such as methylamine, diethylamine, ethylenediamine, etc., or a Friedel-Crafts catalyst such as zinc chloride, aluminum chloride, mercuric chloride, boron trifluoride, etc. These materials act as catalysts in that they serve to increase the amount of sulfur which combines with the ethylene under any given set of reaction conditions.

If desired, the reaction may be carried out in two or more stages, whereby ethylene and sulfur are initially reacted under the conditions stated above to obtain a polyethylene sulfide product of low or moderate sulfur content, and the latter product is thereafter reacted with an additional quantity of elemental sulfur to obtain a polyethylene polysulfide of relatively high sulfur content. When operating in such manner, the second stage reaction is effected at temperatures between about 50° and about 200° C. and under sufficient pressure to maintain the reactants in the liquid phase. Between about 1 and about 5 gram atomic weights of sulfur are employed per gram molecular weight of the polyethylene sulfide reactant; upon completion of the reaction any unreacted sulfur is separated from the product by cooling the latter to room temperature and filtering.

The reaction may be carried out batch-wise, continuously or semi-continuously employing conventional techniques and equipment for effecting chemical reactions at elevated temperatures and pressures. A satisfactory batch procedure consists simply in charging an ordinary rocking or rotating autoclave or other pressure vessel with the desired amounts of sulfur and ethylene. The latter is preferably introduced into the vessel under a pressure of 500–1500 p.s.i.g. The vessel and contents are then heated at the desired reaction temperature until the reaction is complete, after which the vessel is depressured to recover any unreacted olefine and normally gaseous by-products. Completion of the reaction is indicated by the pressure within the vessel decreasing to a fixed value, and usually occurs in from about 1 to about 16 hours. If desired, the reaction product may be employed in preparing the present fungicidal compositions directly as it is taken from the reaction vessel. Preferably, however, it is treated, as by distillation or gas-stripping, to remove dissolved gases and low boiling by-products. According to a preferred mode of operation, the product is initially purified by removing those constituents which boil below about 140° C. under 0.4 mm. pressure, and the remainder is employed without further purification in preparing the present fungicidal compositions. If desired, however, the initially purified product may be further purified by fractional distillation under vacuum.

The following examples illustrate the preparation of several of the present class of fungicidal polyethylene sulfides, but are not to be construed as limiting the invention:

Example I

A rocking autoclave of 4-liter capacity is charged with 400 grams of sulfur and 15 grams of liquid ammonia. The autoclave is then closed, and is pressured to about 1000 p.s.i.g. with ethylene. The autoclave and contents are then heated at about 140° C. with agitation for about 10 hours, during which period the pressure rises to about 2700 p.s.i.g. and then falls to about 2000 p.s.i.g. The autoclave is then cooled, the pressure is released, and the oily black reaction product is filtered and transferred to a simple vacuum distillation apparatus wherein it is heated to about 140° C. under a pressure of about 0.1 mm. The distillation residue is a heavy black oil containing 74 percent by weight of sulfur, and corresponding to the empirical formula $C_2H_4S_{2.5}$. It shows sharp absorption in the infrared spectrum at 7.27, 8.2 and 8.4 microns. This product is hereinafter referred to as Product A.

*Example II*

Approximately 400 grams of sulfur and 15 grams of anhydrous ammonia are introduced into a 4-liter autoclave, and the latter is then pressured to about 900 p.s.i.g. with ethylene. The autoclave and contents are then heated to a temperature of about 145° C. over a period of about 1.25 hours, during which time the pressure gradually increases to about 3500 p.s.i.g. Heating is continued at about 145° C. for about 16 hours, during which time the pressure falls to about 1900 p.s.i.g. After allowing the autoclave to cool, the excess pressure is released and the contents are removed. The product so obtained is a heavy black oil in the amount of about 675 grams. Upon filtration, there is separated about 14 grams of a soft solid material. The liquid filtrate, hereinafter referred to as Product B, is then heated at 50° C. under 0.6 mm. pressure to strip off low-boiling materials, and the stripped material is then distilled to remove constituents distilling below about 140° C. at 0.4 mm. The residue, hereinafter referred to as Product C, is filtered to remove a small quantity of solid material, and the filtrate is collected as a purified product, hereinafter referred to as Product D. Analysis shows Products C and D to contain 67.7 and 63.1 percent sulfur, respectively.

*Example III*

Example II is repeated to the point where the excess pressure is released. The autoclave is then opened and the crude reaction product is taken up in carbon disulfide and transferred to a vacuum distillation apparatus where it is heated to about 50° C. under 0.4 mm. pressure. The distillation residue, in the amount of 560 grams is then filtered to remove about 37 grams of solid material. The filtrate analyzes about 32.2 percent carbon, about 5.6 percent hydrogen, and about 62.2 percent sulfur. One hundred grams of this product is then further sulfurized by heating with 128 grams of elemental sulfur and 2.3 grams of zinc chloride catalyst in a closed vessel at about 150° C. for about 1 hour. The product obtained is then gas-stripped with nitrogen at room temperature under 1 mm. pressure, and is filtered to obtain 126 grams of liquid filtrate analyzing about 21.0 percent carbon, about 3.2 percent hydrogen and about 78.6 percent sulfur. This material is hereinafter referred to as Product E.

The fungicidal compositions of the present invention are prepared by combining one or a mixture of the polyethylene sulfides of the present class with a liquid or solid carrier material in the conventional manner. Thus, the polyethylene sulfide product may be dispersed in water with the aid of a dispersing agent to form a concentrate composition which is subsequently diluted with water to form a spray suitable for application to living plants, lumber and other materials subject to fungus attack. Alternatively, the products may be admixed with an inert solid diluent such as talc, diatomaceous earth, aluminum silicate, etc., to form dry compositions which can be employed as such in the form of dusts or which can be dispersed in an aqueous or oleaginous medium to form a liquid spray. In general, any of the conventional formulation and application techniques may be followed in employing the present fungicidal products, and any of the various known wetting agents, spreaders, sticking agents, diluents, etc., may be employed in combination with such products. The latter are substantially non-phytotoxic and may be applied to living plants in relatively high concentrations. However, they are effective in relatively small quantities, and in the interests of economy they are usually applied at concentrations of the order of 50–4000 parts per million. Liquid concentrate compositions usually contain between about 1 and about 15 percent of the active ingredient and sufficient of an emulsifying or dispersing agent to maintain the active ingredient uniformly dispersed in the liquid suspending medium. Solid concentrate compositions usually contain between about 5 and about 50 percent by weight of the active ingredient and, optionally, small amounts of spreading agents, dispersing agents, and other conventional adjuvants.

The following examples will illustrate the formulation of a number of fungicidal compositions within the scope of the invention, but are not to be construed as limiting the same.

*Example IV*

| | Lbs. |
|---|---|
| Polyethylene sulfide | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition.

*Example V*

| | Lbs. |
|---|---|
| Polyethylene sulfide | 2.5 |
| Water | 50.0 |
| Powdered blood albumen | 0.25 |

The polyethylene sulfide and blood albumen are added to the water, and the mixture is then passed through a colloid mill or high speed blender to obtain a concentrate composition which can be diluted 1000:1 to obtain a fungicidal spray.

*Example VI*

| | Lbs. |
|---|---|
| Polyethylene sulfide | 0.5 |
| Benzene | 5.0 |
| Non-phytotoxic spray oil | 4000.0 |

This composition is suitable for use as a tree spray.

*Example VII*

| | Lbs. |
|---|---|
| Polyethylene sulfide | 10.0 |
| Kerosene extract oil | 150.00 |

This composition is useful for impregnating lumber.

*Example VIII*

| | Lbs. |
|---|---|
| Polyethylene sulfide | 2.5 |
| Water | 50.0 |
| Commercial sticking agent | 0.5 |
| Commercial spreading agent | 0.5 |

The ingredients are mixed in a colloid mill and are thereafter diluted with 1200 gallons of water to obtain a spray composition containing about 250 parts per million of the active ingredient.

*Example IX*

| | Lbs. |
|---|---|
| Polyethylene sulfide | 0.5 |
| Non-ionic dispersing agent | 0.2 |
| Water | 500.0 |

*Example X*

| | Lbs. |
|---|---|
| Polyethylene sulfide | 2.0 |
| Walnut shell flour | 40.0 |
| Petroleum sulfonates | 0.2 |

The ingredients are thoroughly admixed in a ball mill to obtain a dry concentrate composition which can subsequently be dispersed in water to form a spray.

In order to demonstrate the fungicidal activity of the present products, the following procedure is employed: The material to be tested is formulated into a wettable powder by grinding together, and intimately admixing the following ingredients:

| Ingredient | Percent by wt. |
|---|---|
| Test material | 10.0 |
| Attapulgus clay | 30.0 |
| "Neoterge" wetting agent | 0.12 |
| "Duponol ME" wetting agent | 0.05 |
| Lignin sulfate suspending agent | 0.12 |

This composition is then dispersed in water with the aid of a high-speed blender to obtain spray compositions of the desired concentration. The test method itself is the so-called "stripped-leaf" procedure, wherein healthy leaves of the test plant are supported with their petioles immersed in water and are then sprayed with 30 ml. of the test composition. After the latter has been allowed to dry, the leaves are sprayed with the spores of the test fungus. After being allowed tto stand under greenhouse conditions for 6 days, the leaves are examined for growth of the test fungus, and the effectiveness of the test composition is determined by comparison with untreated controls. The following table presents the results obtained by subjecting several of the aforementioned polyethylene sulfide products to the above-described procedure.

| Active Ingredient | | Percent Control | | |
|---|---|---|---|---|
| Identity | Conc., p.p.m. | Alternaria solani on tomatoes | Peronospora parasitica on cabbage | Septoria lycopersici on tomatoes |
| Product A (from Example I) | 2,000 | 95–100 | | |
| Product B (from Example II) | 1,000 | 95–100 | | |
| Do | 250 | 75–95 | | |
| Product C (from Example II) | 500 | | 95–100 | 75–95 |
| Do | 2,000 | 75–95 | 95–100 | 75–95 |
| Product D (from Example II) | 2,000 | | 95–100 | 75–95 |
| Product E (from Example III) | 2,000 | 95–100 | 95–100 | 95–100 |
| Do | 1,000 | 95–100 | | |
| Do | 500 | 95–100 | | |
| Do | 250 | 95–100 | | |

In addition to the above-demonstrated fungicidal properties, the present polyethylene sulfides and compositions comprising the same found to be effective in controlling various types of aphis on living plants; accordingly the present compositions may be employed for the simultaneous control of aphis and fungi.

Other modes of applying the principle of our invention may be employed instead of those explained, change being made as regards the methods or materials employed, provided the composition or steps stated by any of the following claims, or the equivalent of such stated compositions or steps, be obtained or employed.

We, therefore, particularly point out and distinctly claim as our invention:

1. A fungicidal composition comprising an inert fungicidal carrier material and, as the essential fungitoxic ingredient, a normally liquid product obtained by heating ethylene with elemental sulfur at a reaction temperature between about 75° C. and about 250° C. and at a pressure between about 200 and about 5000 p.s.i.g., and thereafter separating from the product so obtained the components thereof which boil below about 140° C. under about 0.4 mm. pressure, the proportions of ethylene and sulfur and the time of said heating being such that the said product contains between 1 and about 6 atoms of sulfur per molecule of ethylene.

2. A composition as defined by claim 1 wherein the said carrier material comprises a particulate inorganic solid.

3. A composition as defined by claim 1 wherein the said carrier material comprises water and sufficient of a dispersing agent to maintain said fungitoxic material uniformly dispersed in said water.

4. A fungicidal composition comprising an inert fungicidal carrier mateiral and, as the essential fungitoxic material, a normally liquid product obtained by heating ethylene with elemental sulfur at a reaction temperature between about 120° C. and about 160° C. and at a pressure between about 1500 and about 5000 p.s.i.g., and thereafter separating from the product so obtained the components thereof which boil below about 140° C. under about 0.4 mm. pressure, at least about one gram molecular weight of ethylene being provided per gram atomic weight of sulfur and said heating being effected for such period of time that said liquid product contains between 1 and about 6 atoms of sulfur per molecule of ethylene.

5. A composition as defined by claim 4 wherein the said carrier material is a particulate inorganic solid.

6. A composition as defined by claim 4 wherein the said carrier material comprises water and sufficient of a dispersing agent to maintain said fungitoxic ingredient uniformly dispersed in said water.

7. A composition of matter adapted to being diluted with water to form a fungicidal composition, comprising water; between about 1 and about 15 percent by weight of a normally liquid product obtained by heating ethylene with elemental sulfur at a reaction temperature between about 120° C. and about 160° C. and at a pressure between about 1500 and about 3000 p.s.i.g., and thereafter separating from the product so obtained the components thereof which boil below about 140° C. under about 0.4 mm. pressure, at least about one gram molecular weight of ethylene being provided per gram atomic weight of sulfur and said heating being carried out for such period of time that the said liquid product contains between about 1 and about 6 atoms of sulfur per molecule of ethylene; and sufficient of a dispersing agent to maintain said liquid product uniformly dispersed in said water.

8. A composition of matter adapted to being diluted with water to form a fungicidal composition, comprising an inert particulate inorganic fungicidal carrier material between about 5 and about 50 percent by weight of a normally liquid product obtained by heating ethylene with elemental sulfur at a reaction temperature between about 120° C. and about 160° C. and at a pressure between about 1500 and about 3000 p.s.i.g., and thereafter separating from the product so obtained the components thereof which boil below about 140° C. and under about 0.4 mm. pressure, at least about one gram molecular weight of ethylene being provided per gram atomic weight of sulfur and said heating being carried out for such period of time that the said liquid product contains between about 1 and about 6 atoms of sulfur per molecule of ethylene; and sufficient of a dispersing agent to maintain said liquid product uniformly dispersed in said water.

9. The method of controlling the growth of fungi on plants which comprise applying thereto a fungicidal amount of a composition as defined by claim 1.

10. The method of controlling the growth of fungi on plants which comprises applying thereto a fungicidal amount of a composition as defined by claim 4.

11. The method for preparing a fungitoxic material which comprises heating ethylene and elemental sulfur at a reaction temperature between about 75° C. and about 250° C. and at a pressure between about 200 and about 5000 p.s.i.g., and thereafter separating from the product so obtained the components thereof which boil below about 140° C. at about 0.4 mm. pressure, at least about one gram molecular weight of ethylene being employed per gram atomic weight of sulfur and said heating being carried out for such period of time that the product from which said low-boiling components have been separated contains between 1 and about 6 atoms of sulfur per molecule of ethylene.

12. A fungicidal composition comprising an inert fungicidal carrier material and, as the essential fungitoxic ingredient, a normally liquid product obtained by heating ethylene with elemental sulfur at a reaction temperature between about 75° C. and about 250° C. and at a pressure between about 200 and about 5000 p.s.i.g., the proportion of ethylene and sulfur and the time of said heating being such that the said product contains between 1 and about 6 atoms of sulfur per molecule of ethylene, separating from the product so obtained the components thereof which boil below about 140° C. at about 0.4 mm. pressure, and thereafter heating the product from which said low-boiling components have been separated with elemental sulfur at a reaction temperature between about 50 and about 200° C. under sufficient pressure to maintain the reactants in the liquid phase, between about 1 and about 5 gram atomic weights of sulfur being employed per gram molecular weight of said product from which said low-boiling components have been separated.

References Cited in the file of this patent

UNITED STATES PATENTS

| | | |
|---|---|---|
| 2,150,759 | Carter | Mar. 14, 1939 |
| 2,402,685 | Signaigo | June 25, 1946 |
| 2,415,852 | Schulze | Feb. 18, 1947 |
| 2,425,824 | Peters | Aug. 19, 1947 |
| 2,470,529 | Stewart | May 17, 1949 |
| 2,527,948 | Lyon | Oct. 31, 1950 |
| 2,529,355 | Schulze | Nov. 7, 1950 |
| 2,560,421 | Eby | July 10, 1951 |
| 2,568,033 | Stewart | Sept. 18, 1951 |
| 2,568,034 | Stewart | Sept. 18, 1951 |
| 2,568,035 | Stewart | Sept. 18, 1951 |
| 2,325,194 | Olim | July 27, 1953 |
| 2,743,209 | Jones | Apr. 24, 1956 |